(12) United States Patent
Bates et al.

(10) Patent No.: US 8,899,343 B2
(45) Date of Patent: Dec. 2, 2014

(54) REPLACING CONTIGUOUS BREAKPOINTS WITH CONTROL WORDS

(75) Inventors: Cary L. Bates, Rochester, MN (US); Justin K. King, Rochester, MN (US); Lee Nee, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/612,089

(22) Filed: Sep. 12, 2012

(65) Prior Publication Data

US 2014/0075418 A1    Mar. 13, 2014

(51) Int. Cl.
G06F 9/44    (2006.01)
G06F 9/45    (2006.01)
G06F 11/36   (2006.01)

(52) U.S. Cl.
CPC .......... *G06F 8/4441* (2013.01); *G06F 11/3636* (2013.01); *G06F 11/3664* (2013.01)
USPC ............................. 171/129; 717/154; 717/131

(58) Field of Classification Search
USPC ......................................................... 717/129
See application file for complete search history.

(56) References Cited

U.S. PATENT DOCUMENTS

| | | | |
|---|---|---|---|
| 2003/0188225 A1* | 10/2003 | Bates et al. .................... | 714/38 |
| 2007/0005322 A1 | 1/2007 | Patzer et al. | |
| 2008/0168428 A1 | 7/2008 | Bates | |
| 2012/0102460 A1 | 4/2012 | Bates | |
| 2012/0110552 A1 | 5/2012 | Bates | |
| 2012/0110555 A1* | 5/2012 | Bates et al. .................. | 717/129 |
| 2012/0304010 A1* | 11/2012 | Opstad et al. .................. | 714/34 |
| 2013/0232473 A1* | 9/2013 | Braun et al. .................. | 717/129 |

OTHER PUBLICATIONS

Charles Lefurgy, Peter Bird, I-Cheng Chen, and Trevor Mudge, Improving Code Density Using Compression Techniques, Published in the Proceedings of Micro-30, Dec. 1-3, 1997 in Research Triangle Park, NC.*

* cited by examiner

*Primary Examiner* — Wei Zhen
*Assistant Examiner* — Timothy Duncan
(74) *Attorney, Agent, or Firm* — Owen J. Gamon; Roy W. Truelson

(57) ABSTRACT

In an embodiment, a first execution path in a program is determined that has been executed a largest number of times, as compared to at least one other path in the program. Swapped instructions are replaced in the program with breakpoints, wherein the swapped instructions are not on the first execution path. The breakpoints that are not on the first execution path and that are contiguous to each other are replaced in the program with a control word.

20 Claims, 10 Drawing Sheets

BREAKPOINT TABLE (154)

| PROGRAM ID (512) | LINE (514) | SWAPPED INSTRUCTION (516) | PROBABILITY OF EXECUTION (518) | |
|---|---|---|---|---|
| PROGRAM A | 5 | IF D*3>Y | .25 | 502 |
| PROGRAM A | 6 | C = D - C | .25 | 504 |
| PROGRAM A | 7 | X = X + 3 | .25 | 506 |
| PROGRAM A | 8 | ELSE | 0 | 508 |
| PROGRAM A | 9 | C = X + 4 | 0 | 510 |

FIG. 5

PATH TABLE (156)

| PROGRAM ID (610) | PATH (612) | EXECUTION COUNT (614) | |
|---|---|---|---|
| PROGRAM A | 1, 2, 3, 4, 10 | 3 | 602 |
| PROGRAM A | 1, 4, 5, 6, 7, 10 | 1 | 604 |
| PROGRAM B | 8, 16, 17, 18, 24 | 16 | 606 |

FIG. 6

REPLACING CONTIGUOUS BREAKPOINTS WITH CONTROL WORDS

FIELD

An embodiment of the invention generally relates to computer systems and more particularly to programs that are downloaded from a server computer to a client computer, where the programs execute.

BACKGROUND

Computer systems typically comprise a combination of computer programs and hardware, such as semiconductors, transistors, chips, circuit boards, storage devices, and processors. The computer programs are stored in the storage devices and are executed by the processors.

Computers are often connected via networks, such as in cloud computing or client/server models. In one use of such models, programs (also called applications or applets) are downloaded from one computer, called a server, across a network to another computer, called a client, where the programs execute.

SUMMARY

A method, computer-readable storage medium, and computer system are provided. In an embodiment, a first execution path in a program is determined that has been executed a largest number of times, as compared to at least one other path in the program. Swapped instructions are replaced in the program with breakpoints, wherein the swapped instructions are not on the first execution path. The breakpoints that are not on the first execution path and that are contiguous to each other are replaced in the program with a control word.

BRIEF DESCRIPTION OF THE SEVERAL VIEWS OF THE DRAWINGS

FIG. 5 depicts a block diagram of an example data structure for a breakpoint table, according to an embodiment of the invention.

FIG. 6 depicts a block diagram of an example data structure for a path table, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
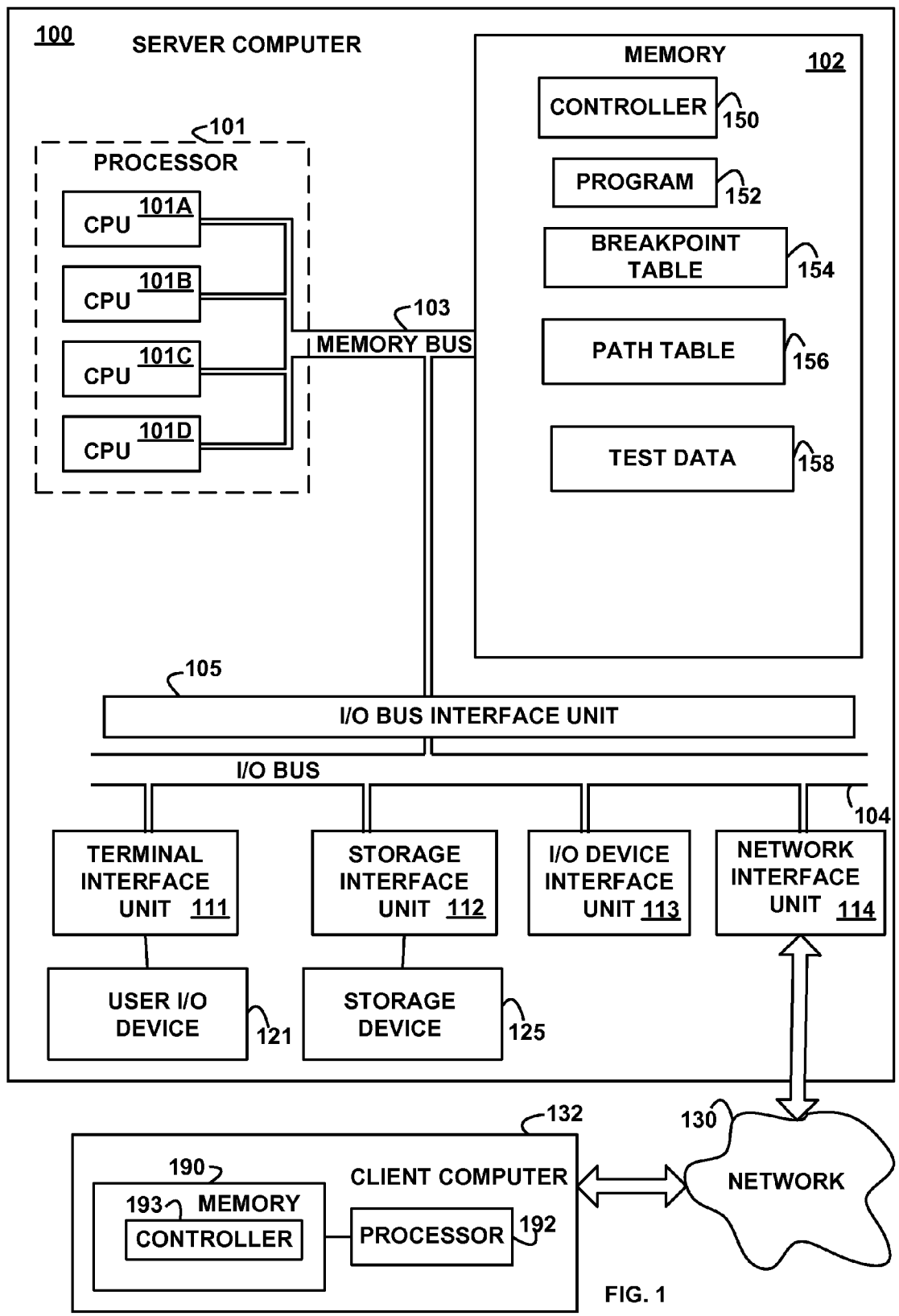
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a main memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the server computer system 100, and may also include the virtual memory of other computer systems coupled to the server computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 150, a program 152, a breakpoint table 154, a path table 156, and test data 158. Although the controller 150, the program 152, the breakpoint table 154, the path table 156, and the test data 158 are illustrated as being contained within the memory 102 in the server computer system 100, in other embodiments some or all of them may be on different computer systems and may be accessed remotely, e.g., via the network 130. The server computer system 100 may use virtual addressing mechanisms that allow the programs of the server computer system 100 to behave as if they only have access to a large, single storage entity instead of access to multiple, smaller storage entities. Thus, while the controller 150, the program 152, the breakpoint table 154, the path table 156, and the test data 158 are illustrated as being contained within the main memory 102, these elements are not necessarily all completely contained in the same storage device at the same time. Further, although the controller 150, the program 152, the breakpoint table 154, the path table 156, and the test data 158 are illustrated as being separate entities, in other embodiments some of them, portions of some of them, or all of them may be packaged together.

In an embodiment, the controller 150 and the program 152 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, and 11. In an embodiment, the controller 150 is implemented in hardware via semiconductor devices, chips, field programmable gate arrays, logical gates, circuits, circuit cards, and/or other physical hardware devices in lieu of, or in addition to, a processor-based system. In an embodiment, the controller 150 and/or the program 152 comprise data in addition to instructions or statements.

The memory bus 103 provides a data communication path for transferring data among the processor 101, the main memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and the client computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In particular, the client computer system 132 comprises memory 190 connected to a processor 192. The memory 190 stores a controller 193, which executes on the processor 192. The controller 193 may download the program 152 from the server computer system 100, store the program 152 in the memory 190 and execute the program 152 on the processor 192. The breakpoint table 154, the path table 156, and the test data 158 may also be stored in the memory 190.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and/or the client computer system 132 and that, when read and executed by one or more processors in the server computer system 100 and/or the client computer system 132 or when interpreted by instructions that are executed by one or more processors, cause the server computer system 100 and/or the client computer system 132 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
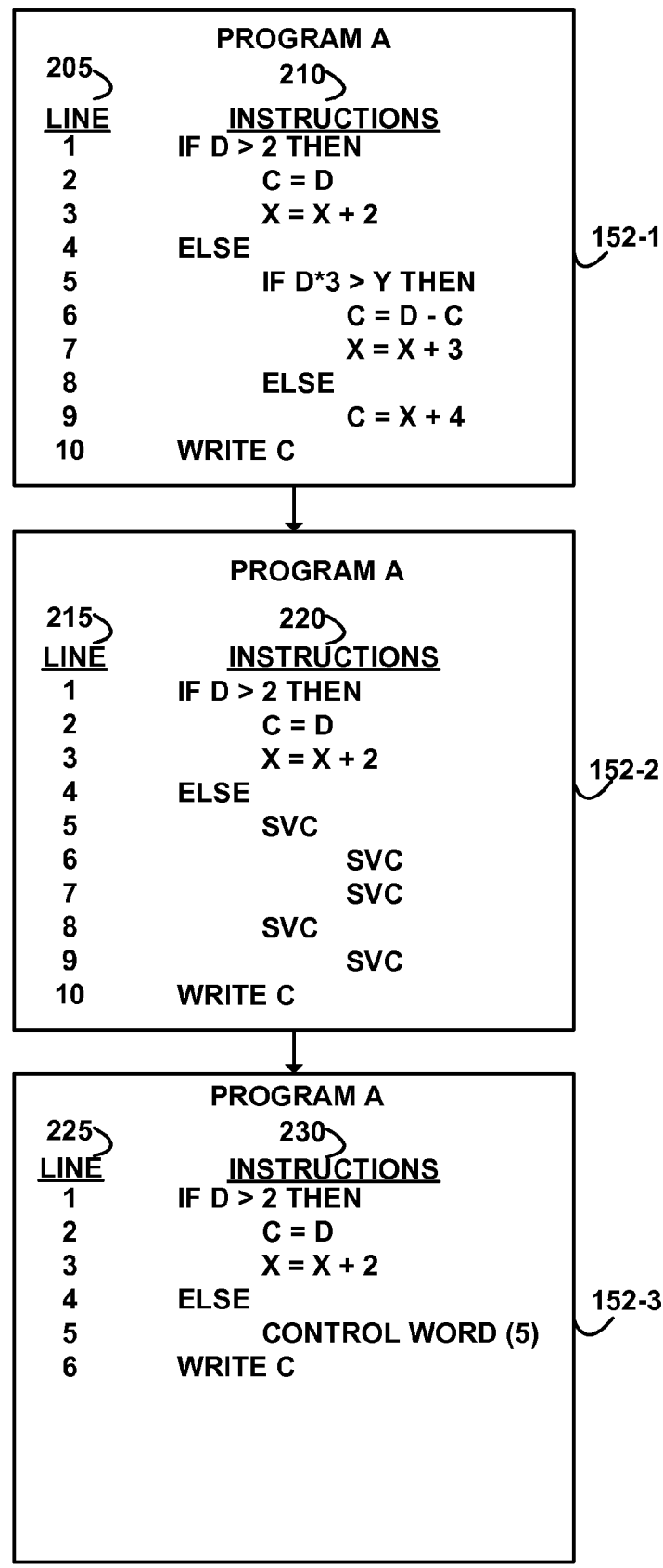
FIG. 2 depicts a block diagram of multiple versions of an example program at a server, with contiguous breakpoints that are not on a determined path replaced by a control word, according to an embodiment of the invention.

FIG. 2 depicts a block diagram of example versions of a program at a server with contiguous breakpoints that are not on a determined path replaced by a control word, according to an embodiment of the invention. FIG. 2 illustrates versions of program A 152-1, 152-2, and 152-3, which are examples of, and are generically referred to by, the program 152 (FIG. 1). The program A 152-1 comprises lines 205 and instructions 210, each stored within the program A 152-1 at the respective line. The program A 152-2 comprises lines 215 and instructions 220, each stored within the program A 152-2 at the respective line. The program A 152-3 comprises lines 225 and instructions 230, each stored within the program A 152-3 at the respective line. The respective lines 205, 215, and 225 identify the lines, offsets, or addresses of the respective instructions 210, 220, and 230 within the respective program A 152-1, the program A 152-2, and the program A 152-3. Although the instructions 210, 220, and 230 are illustrated in FIG. 2, for convenience of explanation, as source statements that are interpreted or compiled into machine instructions, in other embodiments the instructions 210, 220, and 230 may be machine instructions that execute on the processor 101 or an intermediate form between source statements and machine instructions, such as byte codes.

The controller 150 at the server computer system 100 creates the program A 152-2 from the program A 152-1 by determining an execution path in the program A 152-1 that has been executed a largest number of times, as compared to other execution paths in the program A 152-1. The controller 150 at the server computer system 100 then sets breakpoints in the program 152 by swapping out swapped instructions in the program 152 that are not on the determined execution path and replacing the swapped instructions with breakpoints, to create the program A 152-2. Thus, in the example of FIG. 2, the controller 150 at the server computer system 100 determined that the execution path that was executed the largest number of times was the path that contains the instructions at lines 1, 2, 3, 4, and 10, and all other instructions in the program 152 not on that path are the instructions at lines 5, 6, 7, 8, and 9. The breakpoints are illustrated in the program A 152-2 as SVCs (supervisor instructions).

The controller 150 at the server computer system 100 creates the program A 152-3 from the program A 152-2 by replacing the breakpoints that are contiguous to each other with a control word, which specifies the number of breakpoints that the control word represents. The control word occupies a single instruction. Thus, in an embodiment, the controller 150 at the server computer system 100 has reduced the size of the program 152 from the size of the version of the program 152-1 to the size of the version of the program 152-3, which saves memory and increases the download speed of the program 152 from the server computer system 100 to the client computer system 132. In an embodiment, the controller 150 at the server computer system 100 reduced the size of the program 152 by eliminating infrequently executed instructions, such as error handling instructions.

Various different execution paths exist in the program 152 and are traversed by different executions of the same program 152 because of the existence of control flow instructions in the program 152. A control flow instruction is an instruction for which execution of the control flow instruction by the processor 101 causes the processor 101 to make a choice between which of multiple paths through the program 152 are followed by execution of the program 152 on the processor 101. In various embodiments, execution of control flow instructions cause continuation of execution at a different instruction other than the next sequential instruction (in address order), such as an unconditional branch or jump or a call instruction (from which flow of control may or may not return); such as executing a set of instructions only if the criteria of a condition is met, such as a conditional branch instruction; and such as executing a set of instructions zero or more times, until some condition is met, such as loop instruction. In an embodiment, execution of control flow instructions causes (conditionally or unconditionally) the alteration of the contents of a program counter or instruction pointer of the processor 101 from a value that points at the next sequential instruction (in increasing address order) within the program 152 to a different value, so that the order of execution of instructions in the program 152 is changed (unconditionally or unconditionally).

In various embodiments, the program counter or instruction pointer holds either the memory address of the instruction being executed, or the address of the next instruction to be executed by the processor 101. In an embodiment, the processor 101 increments the program counter automatically after fetching a program instruction, so that the processor 101 normally retrieves instructions sequentially from the memory 102, with certain instructions, such as branches, jumps and subroutine calls and returns, interrupting the sequence by placing a new value in the program counter. Such jump instructions allow the processor 101 to choose a new address as the start of the next part of the flow of instructions from the memory 102. Thus, an execution path comprises the sequence of instructions (identified by the lines), in execution order from beginning to end, that are executed by the processor during an execution of the program 152.

Thus, using the example of FIG. 2, an execution path that comprises lines 2 and 3 may or may not be executed, depending on the value of the variable "D" in the control flow instruction of line 1. The value of the variable "D" may be different during different executions of the program 152 because the program 152 may read different values of the variable "D" from the user I/O device 121 or from the test data 158, or the program 152 may receive different values of the variable "D" from another program or from the network 130.

Figure 3:
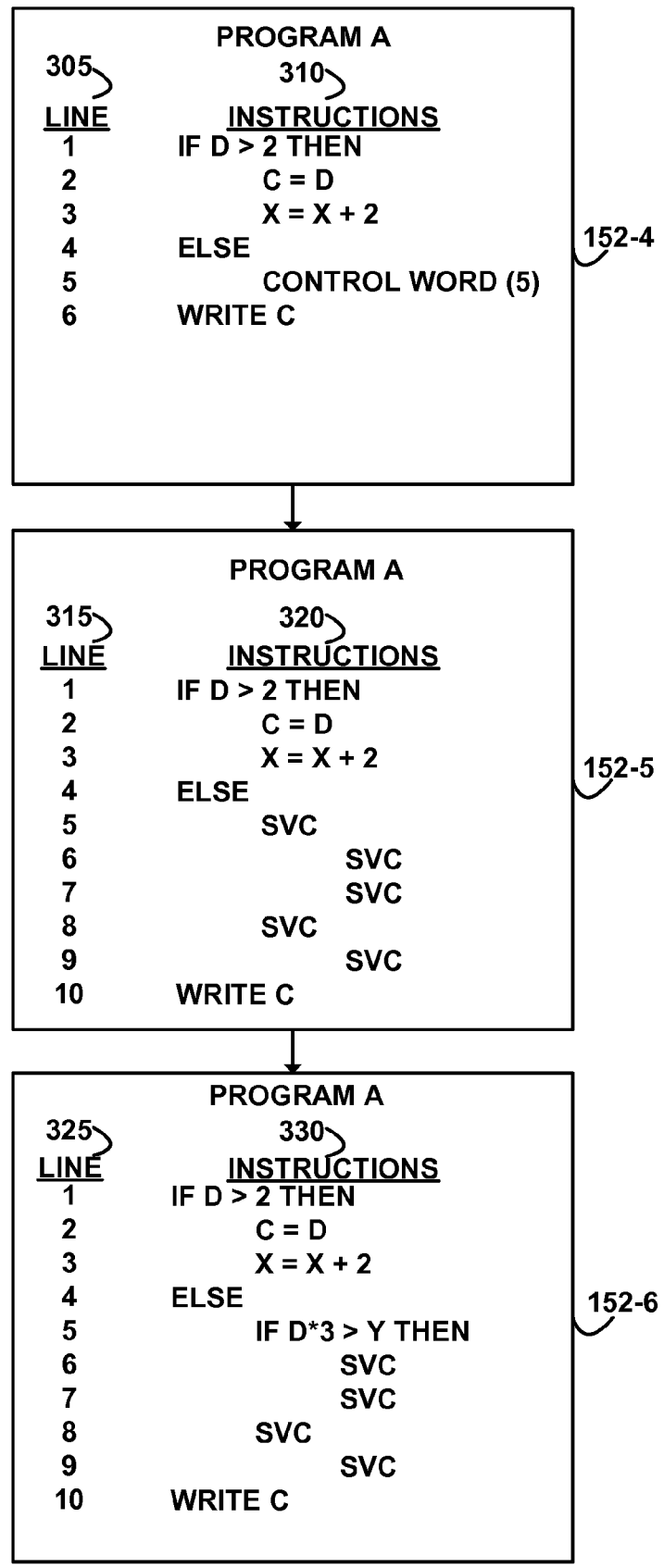
FIG. 3 depicts a block diagram of multiple versions of an example program at a client, with a control word replaced by breakpoints and a swapped instruction, according to an embodiment of the invention.

FIG. 3 depicts a block diagram of example versions of a program 152-4, 152-5, and 152-6 at a client, with a control word replaced by breakpoints and a swapped instruction, according to an embodiment of the invention. The programs 152-4, 152-5, and 152-6 are versions of, and are generically referred to by, the program 152 (FIG. 1). The program A 152-4 comprises lines 305 and instructions 310, each stored within the program A 152-4 at the respective line. The program A 152-5 comprises lines 315 and instructions 320, each stored within the program A 152-5 at the respective line. The program A 152-6 comprises lines 325 and instructions 330, each stored within the program A 152-3 at the respective line. The respective lines 305, 315, and 325 identify the lines, offsets, or addresses of the respective instructions 310, 320, and 330 within the respective program A 152-4, the program A 152-5, and the program A 152-6.

The controller 193 at the client computer system 132 created the program A 152-5 by replacing the control word in the program 152-4 with the number of breakpoints specified by the control word. The controller 193 at the client computer system 132 started the program A 152-5 executing on the processor 101, and in response to execution of the program A 152-5 encountering the breakpoint at line 5, the controller 193 at the client computer system 132 created the program A 152-6 by replacing the breakpoint instruction at line 5 with the swapped instruction specified by the entry in the breakpoint table 154 that specifies the line of 5. The program A 152-6 illustrates that the controller 193 at the client computer system 132 has replaced one breakpoint (the breakpoint at the line 5) with a swapped instruction, but in other embodiments, the controller 193 at the client computer system 132 may replace any number of breakpoints with swapped instructions.

Figure 4:
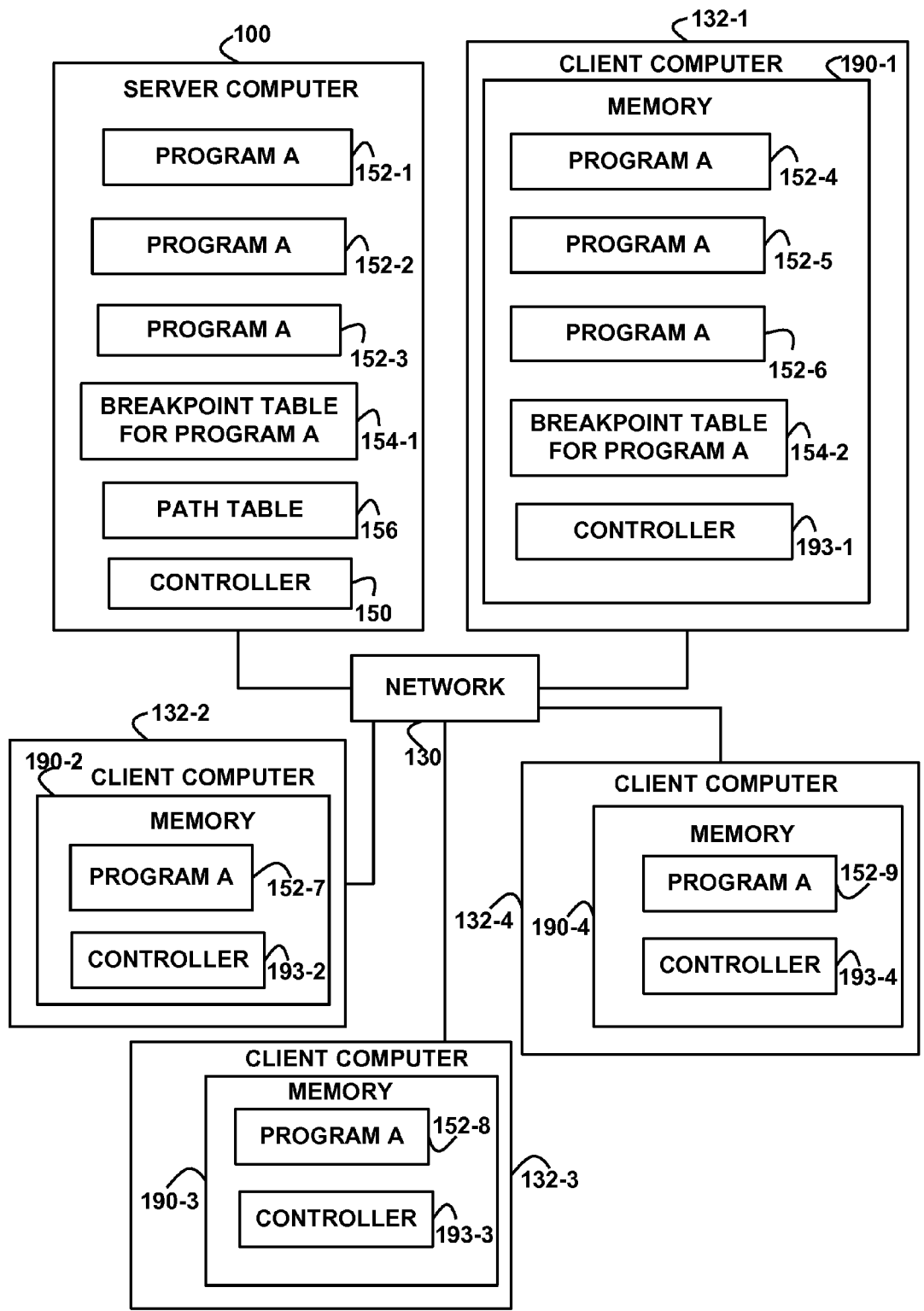
FIG. 4 depicts a block diagram of an example server computer and client computers connected via a network, according to an embodiment of the invention.

FIG. 4 depicts a block diagram of an example server computer 100 and example client computer systems 132-1, 132-2, 132-3, and 132-4 connected via a network 130, according to an embodiment of the invention. The client computer systems 132-1, 132-2, 132-3, and 132-4 are examples of, and are generically referred to by, the client computer system 132 (FIG. 1). The server computer 100 comprises versions of the program A 152-1, 152-2, and 152-3, a breakpoint table 154-1 for the program A, a path table 156, and a controller 150. The client computer 132-1 comprises memory 190-1, which stores versions of the program A 152-4, 152-5, and 152-6, a breakpoint table 154-2 for the program A, and a controller 193-1. The client computer 132-2 comprises memory 190-2, which stores a program A 152-7 and a controller 193-2. The client computer 132-3 comprises the memory 190-3, which stores a program A 152-8 and a controller 193-3. The client computer 132-4 comprises memory 190-4, which stores a program A 152-9 and a controller 193-4.

The memory 190-1, 190-2, 190-3, and 190-4 are examples of, and are generically referred to by, the memory 190 (FIG. 1). The controllers 193-1, 193-2, 193-3, and 193-4 are examples of, and are generically referred to by, the controller 190 (FIG. 1). The program A 152-1, 152-2, 152-3, 152-4, 152-5, 152-6, 152-7, 152-8, and 152-9 are versions of or examples of the program 152 (FIG. 1). The breakpoint tables 154-1 and 154-2 are examples of the breakpoint table 154 (FIG. 1).

FIG. 5 depicts a block diagram of an example data structure for a breakpoint table 154, according to an embodiment of the invention. The example breakpoint table 154 comprises example entries 502, 504, 506, 508, and 510, each of which comprises an example program identifier field 512, a line field 514, a swapped instruction field 516, and a probability of execution field 518. The program identifier field 512, in each entry, identifies a program 152, in which a breakpoint identified by the entry is set. The line field 514, in each entry, identifies a line, address, or offset in the program 152 identified by the program identifier field 512, in the same entry, in which the breakpoint of the entry is set. The swapped instruction field 516, in each entry, specifies the instruction that previously existed at the line 514, in the same entry, in the program 512, in the same entry, prior to being replaced in the program 512 at the line 514 by a breakpoint instruction. The probability of execution field 518, in each entry, is the probability that the breakpoint identified by the entry will be encountered by execution of the program 152 identified by the program identifier field 512, in the same entry.

FIG. 6 depicts a block diagram of an example data structure for a path table 156, according to an embodiment of the invention. The path table 156 comprises example entries 602, 604, and 606, each of which comprises an example program identifier field 610, an example path field 612, and an example execution count field 614. The program identifier field 610, in each entry identifies a program 152. The path field 612, in each entry, identifies an execution path in the program 152 identified by the program identifier field 610, in the same entry. In an embodiment, the path field 612 identifies an execution path by specifying the line numbers of the instructions that are in the path. In various embodiments, a path may comprise instructions, statements, lines, basic blocks, a full path from beginning to end of the execution of the program 152 that may comprise repeated instructions, lines, nodes, or basic blocks, or a partial path that does not comprise repeated lines, nodes, or basic blocks. The execution count field 614, in each entry, specifies the number of executions (performed at the server) of the program 152 that traversed or performed the execution path identified by the path field 612 while using the values specified by an entry in the test data 158 substituted for the variables in the program 152.

Figure 7:
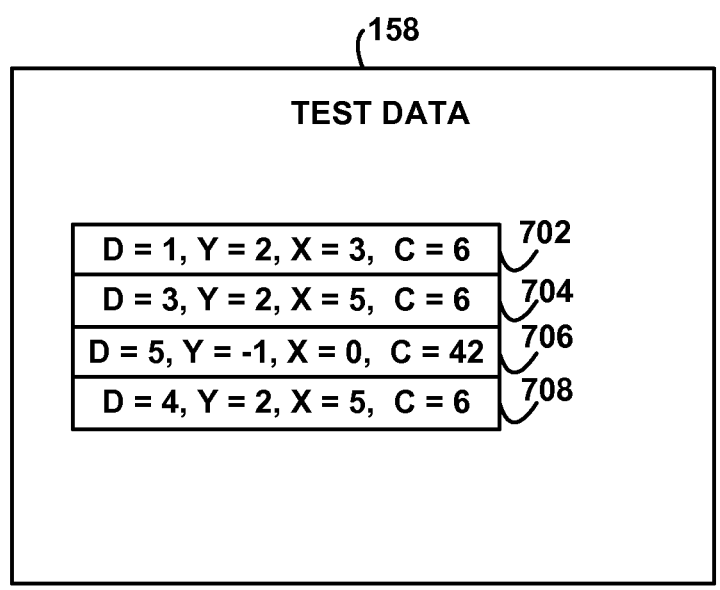
FIG. 7 depicts a block diagram of an example data structure for test data, according to an embodiment of the invention.

FIG. 7 depicts a block diagram of an example data structure for test data 158, according to an embodiment of the invention. The example test data 158 comprises example entries 702, 704, 706, and 708, each of which specifies variables read by the program 152 and respective values of those variables. The program 152, while executing at the server computer system 100, reads an entry of the test data 158 and uses the values of the variables specified by the entry to cause the program 152 to execute different paths within the program 152, depending on the particular values of the variables in the entry that the program 152 read. For example the value of "D=1" in the entry 702 causes the program 152 to not execute the instructions at line 2 and line 3 of the program 152-1 because "1" when substituted for the variable "D" in line 1 is not greater than "2." As another example, the value of "D=3" in the entry 704 causes the program 152 to execute the instructions at line 2 and line 3 of the program 152-1 because "3" when substituted for the variable "D" in line 1 is greater than "2."

Figure 8:
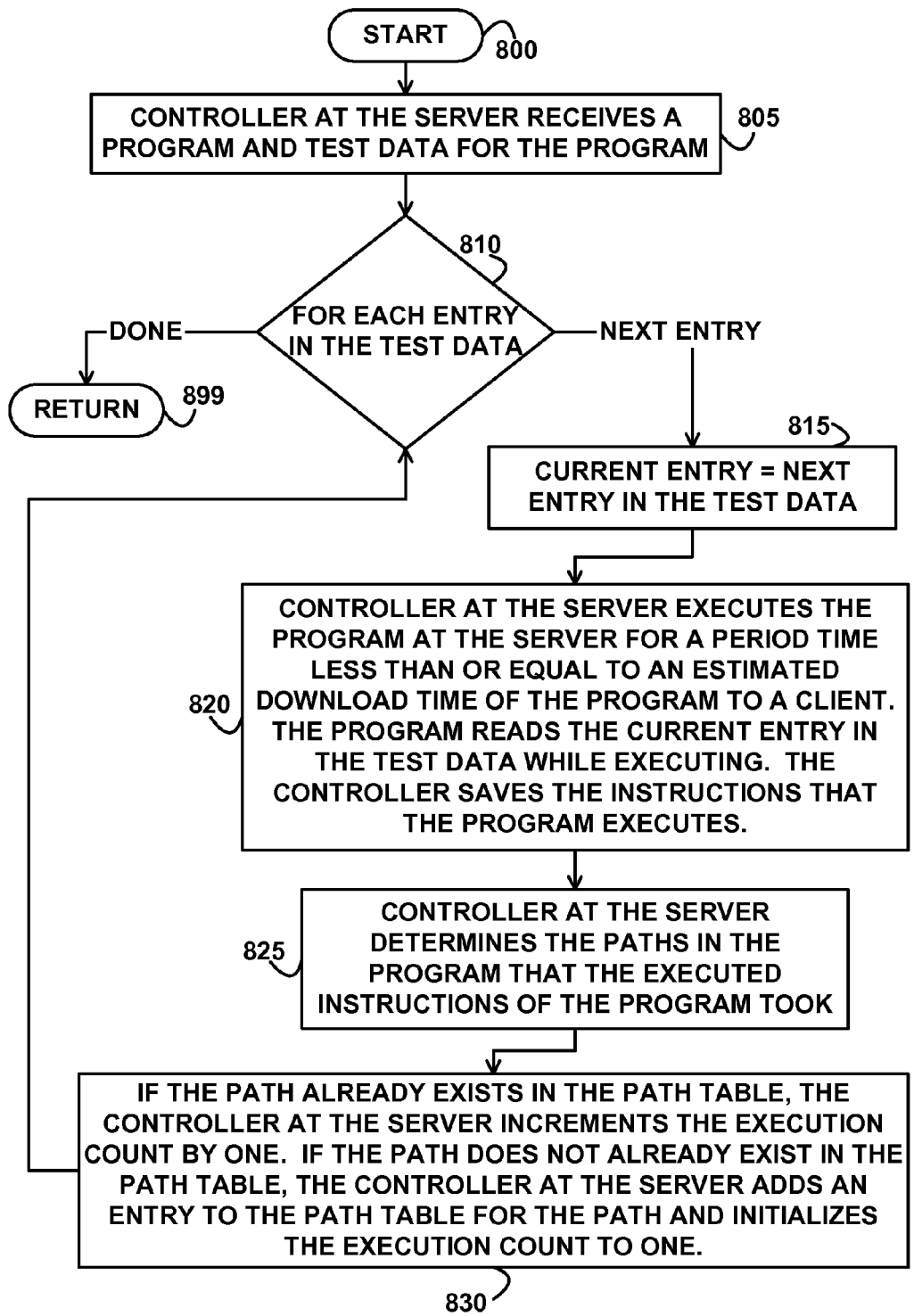
FIG. 8 depicts a flowchart of example processing at a server for determining execution paths in a program, according to an embodiment of the invention.

FIG. 8 depicts a flowchart of example processing at a server for determining execution paths in a program, according to an embodiment of the invention. Control begins at block 800.

Control then continues to block 805 where the controller 150 at the server computer system 100 receives a program 152 and test data 158 for the program 152. In various embodiments, the controller 150 at the server computer system 100 receives the program 152 and/or the test data 158 from an application that executes at the server computer system 100, from the network 130, from the storage device 125, from the I/O device interface unit 113, or from the user I/O device 121.

Control then continues to block 810 where the controller 150 at the server computer system 100 enters a loop that executes once for each entry in the test data 158. So long as entries unprocessed by the loop remain, control continues from block 810 to block 815, where the controller 150 at the server computer system 100 begins processing the next entry in the test data 158. Once all entries in the test data 158 have been read and processed by the logic of FIG. 8, the loop exits from block 810 to block 899 where the logic of FIG. 8 returns.

At block 815, the controller 150 at the server computer system 100 sets the current entry in the test data 158 to be next unprocessed entry in the test data 158. Control then continues to block 820 where the controller 150 at the server computer system 100 executes the program 152 on the processor 101 at the server computer system 100 for a period time that less than or equal to an estimated download time of the program 152 from the server computer system 100 to a client computer system 132. In another embodiment, the controller 150 at the server computer system 100 executes the program 152 until the program 152 ends, regardless of the download time of the program 152.

In an embodiment, the controller 150 at the server computer system 100 estimates the download time of the program 152 by sending a ping message to various client computer systems, calculating the average time to receive a reply to the ping message, calculating an average transmission speed from the average time of reply, calculating the size of the program 152, and calculating the estimated download time of the program 152 from the formula: transmission speed=size of the program 152 divided by the estimated download time. But in other embodiments, any appropriate technique may be used for estimating a download time of the program 152.

While executing at the server computer system 100, the program 152 reads the current entry from the test data 158, and the data for the variables specified by the current entry from the test data 158 causes the execution of the program 152 to traverse or perform a particular execution path of instructions through the program 152. The controller 150 at the server computer system 100 saves the instructions or the addresses or lines of the instructions of the path that the program 152 executes. Control then continues to block 825 where the controller 150 at the server computer system 100 determines the execution path in the program 152 to be the executed instructions of the program 152.

Control then continues to block 830 where if the determined path already exists in the path table 156, then the controller 150 at the server computer system 100 increments the execution count 614 for the determined path in the path table 156 by one. If the determined path does not already exist in the path table 156, then the controller 150 at the server computer system 100 adds an entry to the path table 156 for the determined path and initializes the execution count 614 for the determined path to one. Control then returns to block 810, as previously described above.

Figure 9:
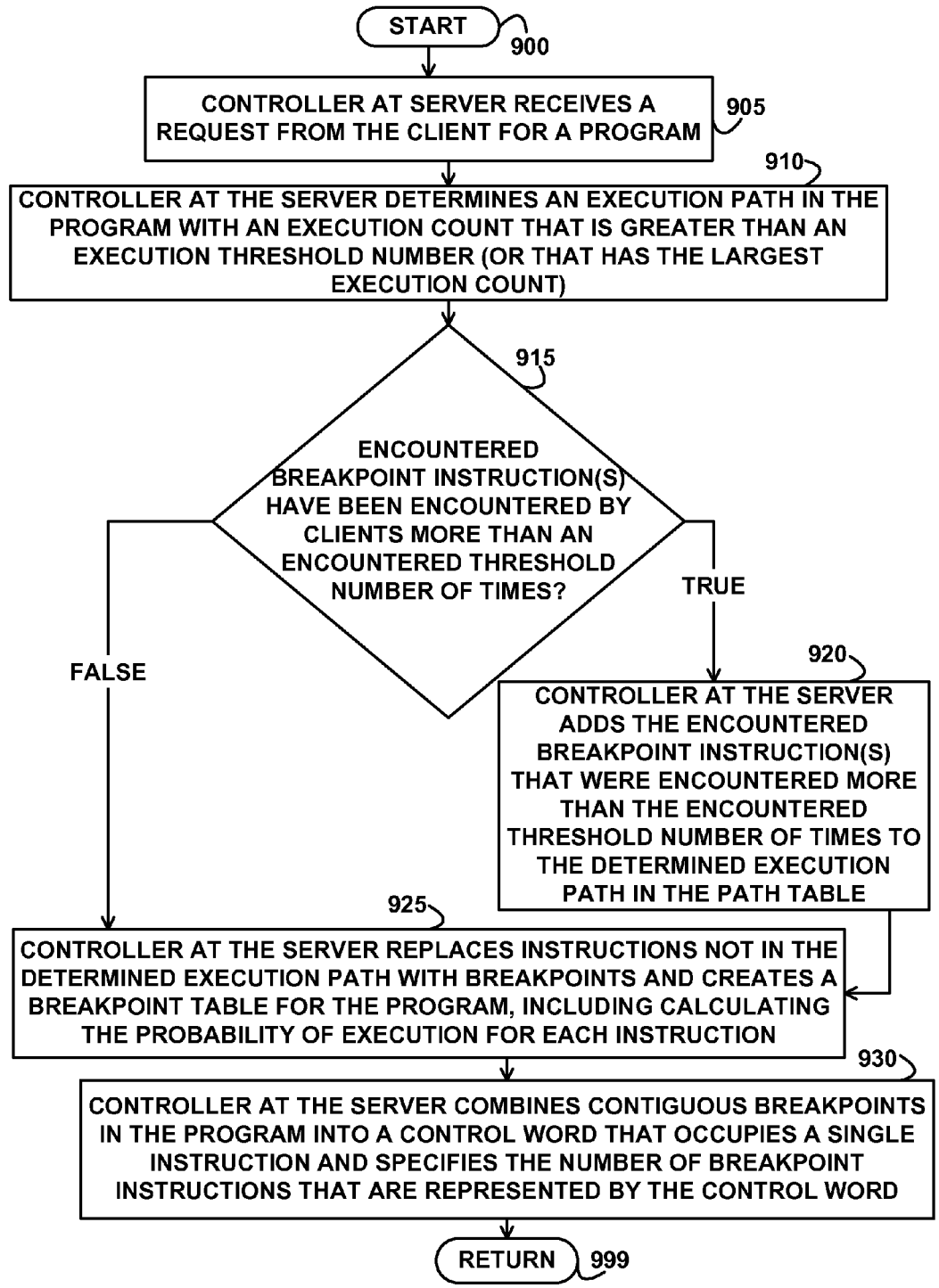
FIG. 9 depicts a flowchart of example processing at a server for replacing contiguous breakpoints that are not on a determined path with a control word, according to an embodiment of the invention.

FIG. 9 depicts a flowchart of example processing at a server for replacing contiguous breakpoints that are not on a determined path with a control word, according to an embodiment of the invention. Control begins at block 900. Control then continues to block 905 where the controller 150 at the server computer system 100 receives a request from a client computer system 132, which requests a program 152 specified by the request be sent to the client computer system 132. Control then continues to block 910 where the controller 150 at the server computer system 100 determines an execution path 612 in the program 152 that has an execution count 614 that is greater than an execution threshold number, or that has the largest execution count 614, as compared to all other execution paths in the program 152. In an embodiment, the controller 150 at the server computer system 100 makes the determination at block 910 by comparing execution counts 614 of all of the entries in the path table 156 that have a program identifier 610 that matches the program identifier specified by the request from the client computer system 132 and selecting the entry with the largest execution count 614 or selecting the entry with the largest execution count 614 that exceeds the execution threshold number. In an embodiment, the controller 150 at the server computer system 100 receives various thresholds from the designer of the controller 150, from the user I/O device 121, from the network 130, or from the client computer system 132.

Control then continues to block 915 where the controller 150 at the server computer system 100 determines whether the encountered breakpoint instruction(s) that were encountered by the requesting client computer system 132 or by all client computer systems were encountered more than an encountered threshold number of times. (The controller 150 at the server computer system 100 receives a specification of the encountered breakpoints from the client computer systems, as further described below with reference to FIG. 10).

If the determination at block 915 is true, then the encountered breakpoint instruction(s) that were encountered by the requesting client computer system 132 or by all client computer systems were encountered more than an encountered threshold number of times, so control continues to block 920 where the controller 150 at the server computer system 100 adds the encountered breakpoint instruction(s) that were encountered more than the encountered threshold number of times to the determined execution path in the path table 156.

Control then continues to block 925 where the controller 150 at the server computer system 100 replaces swapped instructions in the program 152 that are not in the determined execution path with breakpoints and creates a breakpoint table for the program 152, including creating entries for all of the breakpoints, storing the swapped instructions 516 and their lines 514 into the entries, and calculating the probability of execution 518 for each swapped instruction and storing the probability of execution 518 into each entry. In an embodiment, the controller 150 at the server computer system 100 calculates the probability of execution 518, for each swapped instruction by dividing the execution count 614 of the path 612 on which the swapped instruction 516 resides by the sum of the execution counts 614 in all entries of the path table 156 whose program identifier 610 matches the program identifier 512 of the entry in which the probability of execution 518 is stored. The controller 150 at the server computer system 100 allows the instructions that are on the determined execution path to remain in the program 152 and does not replace them with breakpoints.

Control then continues to block 930 where the controller 150 at the server computer system 100 combines contiguous breakpoints in the program 152 and replaces them with a control word that occupies a single instruction and that specifies the number of breakpoints that were replaced and that are represented by the control word. In an embodiment, multiple control words may exist in the program 152, each representing different contiguous breakpoints that are dis-contiguous from the breakpoints represented by the other control words. The controller 150 at the server computer system 100 allows the breakpoints that are not contiguous with each other to remain in the program and does not replace them with control words. Control then continues to block 999 where the logic of FIG. 9 returns.

If the determination at block 915 is false, then the encountered breakpoint instruction(s) that were encountered by the requesting client computer system 132 or by all client computer systems were not encountered more than an encountered threshold number of times, so control continues to block 925, as previously described above, without adding the encountered breakpoint to the determined execution path.

Figure 10:
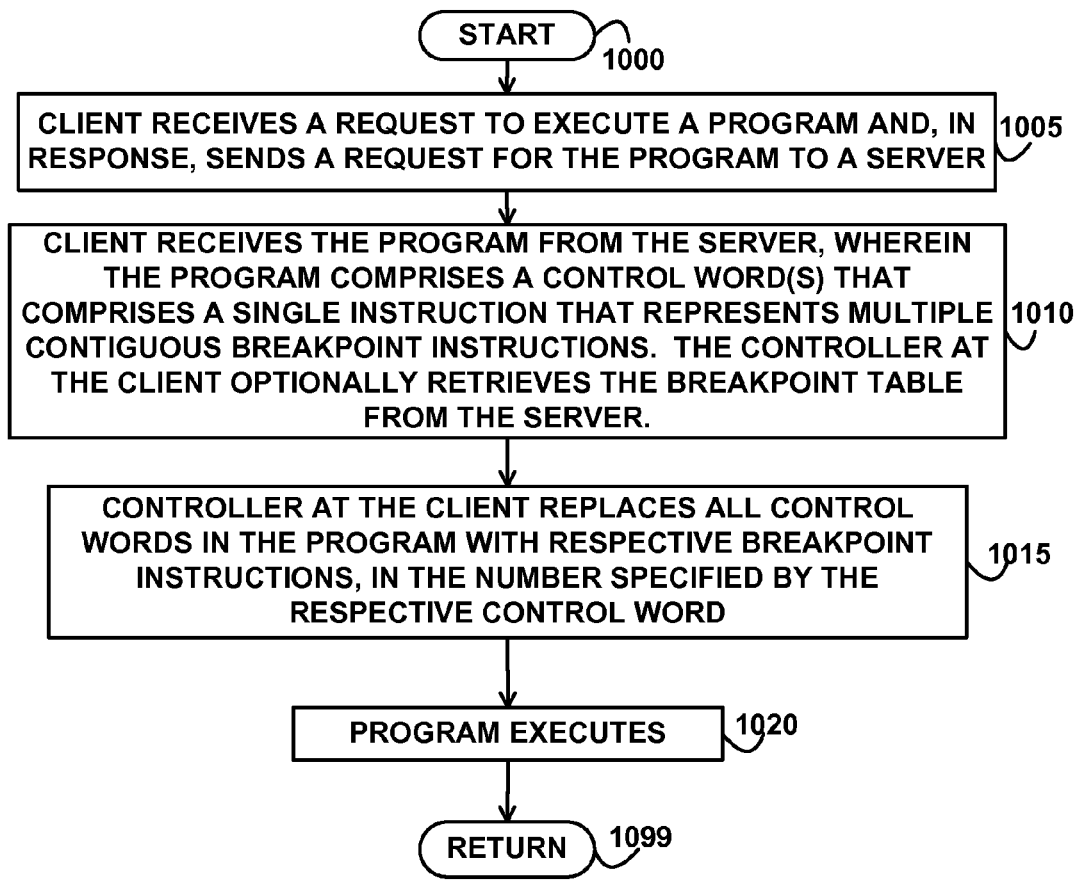
FIG. 10 depicts a flowchart of example processing at a client for executing a program, according to an embodiment of the invention.

FIG. 10 depicts a flowchart of example processing at a client computer system for executing a program 152, according to an embodiment of the invention. Control begins at block 1000. Control then continues to block 1005 where the controller 193 at the client computer system 132 receives a request to execute a program 152 and, in response, sends a request to download the program 152 to a server computer system 100. In an embodiment, the controller 193 at the client computer system 132 receives the request from an application executing at the client computer system 132, from the network 130, or from a user I/O device. Control then continues to block 1010 where the controller 193 at the client computer system 132 receives the requested program 152 from the server computer system 100, in response to the download request. The received program 152 comprises a control word or control words that comprise respective single instructions that represent multiple contiguous breakpoints. The controller 193 at the client computer system 132 optionally starts retrieving the breakpoint table 154, which specifies the breakpoints (represented by the control word(s)) that are set in the program 152, asynchronously from the server computer system 100, after retrieving the program 152. Control then continues to block 1015 where the controller 193 at the client computer system 132 replaces all control words in the program 152 with respective breakpoint instructions, in the number specified by the respective control word. Control then continues to block 1020 where the program 152 executes at the client computer system 132. Control then continues to block 1099 where the logic of FIG. 10 returns.

Figure 11:
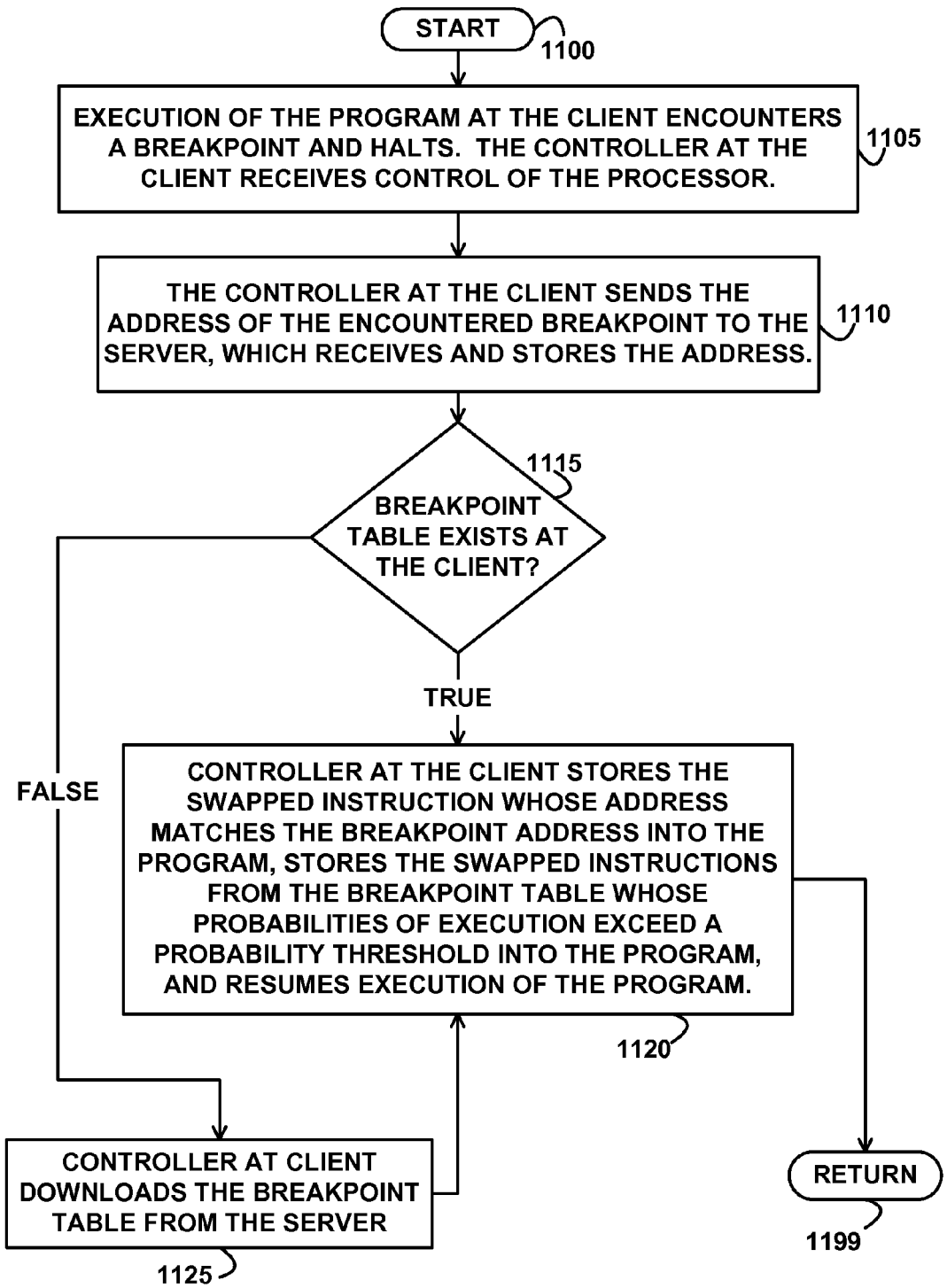
FIG. 11 depicts a flowchart of example processing at a client for responding to execution of a program encountering a breakpoint, according to an embodiment of the invention.

FIG. 11 depicts a flowchart of example processing at a client computer system for responding to execution of a program encountering a breakpoint, according to an embodiment of the invention. Control begins at block 1100. Control then continues to block 1105 where the execution of the program 152 at the client computer system 132 encounters a breakpoint and, in response, halts execution. In an embodiment, the encountering of the breakpoint causes an interrupt, which results in the processor 192 or the operating system giving control of the processor 192, on which the halted program executed, to the controller 193 at the client computer 132. Control then continues to block 1110 where the controller 193 at the client computer system 132 sends the address of the encountered breakpoint to the server computer system 100, from which the program 152 was downloaded, which receives and stores the address in the memory 102 at the server computer system 100. The server computer system 100 may also store an identifier of the client computer system 132 that send the encountered breakpoint to the server computer system 100.

Control then continues to block 1115 where the controller 193 at the client computer system 132 determines whether a breakpoint table 154 for the halted program exists in memory 190 at the client computer system 132. If the determination at block 1115 is true, then a breakpoint table 154 for the halted program exists in the memory 190 of the client computer system 132, so control continues to block 1120 where the controller 193 at the client computer system 132 stores the swapped instruction 516 whose line 514 matches the address or line of the encountered breakpoint into the program 152, stores the swapped instructions 516 from the breakpoint table whose probabilities of execution 518 exceed a probability threshold into the program 152 (regardless of whether or not their lines or addresses matched the line of the encountered breakpoint), and resumes execution of the program 152. In an embodiment, the controller 193 at the client computer system 132 does not store the swapped instructions 516 into the program 152 whose probabilities of execution 518 are less than or equal to the probability threshold. In an embodiment, the controller 193 at the client computer system 132 dynamically adjusts the probability threshold downward, as the execution of the program 152 encounters breakpoints, in proportion to the number of breakpoints encountered by the execution of the program 152 at the client computer system 132. Control then continues to block 1199 where the logic of FIG. 11 returns.

If the determination at block 1115 is false, then a breakpoint table 154 for the halted program 152 does not exist in the memory 190 of the client computer system 132, so control continues to block 1125 where the controller 193 at the client computer system 132 downloads the breakpoint table 154 for the halted program from the server computer system 100 (or waits for any asynchronous downloads of the breakpoint table 154 to complete). Control then continues to block 1120, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   determining a first execution path in a program that has been executed a largest number of times, as compared to at least one other path in the program;
   replacing swapped instructions, in the program, that are not on the first execution path with breakpoints; and
   replacing a plurality of contiguous breakpoints of the breakpoints, in the program, the plurality of contiguous breakpoints not being on the first execution path, with a single control word that specifies the number of the plurality of contiguous breakpoints that the single control word replaces;
   wherein said program is executable by replacing the control word with the number of contiguous breakpoints specified by the control word without executing the control word, and accessing one or more entries in a breakpoint table, each entry corresponding to a respective location of a breakpoint of the contiguous breakpoints, to obtain a respective swapped instruction corresponding to the respective location of the breakpoint of the contiguous breakpoints.

2. The method of claim 1, wherein the control word occupies a single instruction in the program.

3. The method of claim 2, wherein the breakpoint table comprises the swapped instructions that were replaced in the program with the breakpoints and comprises probabilities of execution of the swapped instructions.

4. The method of claim 3, further comprising:
   sending the program from a server computer to a client computer, wherein the client computer replaces the control word, in the program, with the breakpoints that the control word represents, in the number specified by the control word, prior to execution of the program at the client computer.

5. The method of claim 4, further comprising:
   sending the breakpoint table from the server computer to the client computer after the sending the program to the client computer.

6. The method of claim 4, further comprising:
   sending the breakpoint table from the server computer to the client computer after execution of the program at the client computer encounters one of the breakpoints.

7. The method of claim 4, wherein, in response to execution of the program at the client computer encountering one of the breakpoints, the client computer stores, into the program, the swapped instructions from the breakpoint table that have the probabilities of execution that exceed a probability threshold.

8. The method of claim 1, wherein the determining the first execution path in the program further comprises:
   executing the program at a server computer for a period of time that is less than an estimated download time of the program from the server computer to a client computer;
   determining, at the server computer, a plurality of execution paths that the program took during the period of time, wherein the first execution path is one of the plurality of execution paths;
   counting, at the server computer, the number of times that the first execution path was executed at the server computer during the period of time; and
   adding, at the server computer, encountered instructions to the first execution path, wherein the encountered instructions were encountered by execution of the program at the client computer more than an encountered threshold number of times.

9. The method of claim 1, further comprising:
   allowing the instructions that are on the first execution path to remain in the program; and allowing the breakpoints that are not contiguous to each other to remain in the program.

10. A non-transitory computer-readable storage medium encoded with instructions, wherein the instructions when executed comprise:
    determining a first execution path in a program that has been executed a largest number of times, as compared to at least one other path in the program;
    replacing swapped instructions, in the program, that are not on the first execution path with breakpoints;
    replacing a plurality of contiguous breakpoints of the breakpoints, in the program, the plurality of contiguous breakpoints not being on the first execution path, with a single control word, wherein the single control word occupies a single instruction in the program and specifies a number of the contiguous breakpoints that the single control word represents; and
    creating a breakpoint table that comprises the swapped instructions that were replaced in the program with the breakpoints and that comprises probabilities of execution of the swapped instructions;
    wherein said program is executable by replacing the control word with the number of contiguous breakpoints specified by the control word without executing the control word, and accessing one or more entries in a breakpoint table, each entry corresponding to a respective location of a breakpoint of the contiguous breakpoints, to obtain a respective swapped instruction corresponding to the respective location of the breakpoint of the contiguous breakpoints.

11. The non-transitory computer-readable storage medium of claim 10, further comprising:
    sending the program from a server computer to a client computer, wherein the client computer replaces the control word, in the program, with the breakpoints that the control word represents, in the number specified by the control word, prior to execution of the program at the client computer.

12. The non-transitory computer-readable storage medium of claim 11, further comprising:
    sending the breakpoint table from the server computer to the client computer after the sending the program to the client computer.

13. The non-transitory computer-readable storage medium of claim 11, further comprising:
    sending the breakpoint table from the server computer to the client computer after execution of the program at the client computer encounters one of the breakpoints.

14. The non-transitory computer-readable storage medium of claim 11, wherein, in response to execution of the program at the client computer encountering one of the breakpoints, the client computer stores, into the program, the swapped instructions from the breakpoint table that have the probabilities of execution that exceed a probability threshold.

15. The non-transitory computer-readable storage medium of claim 10, wherein the determining the first execution path in the program further comprises:
    executing the program at a server computer for a period of time that is less than an estimated download time of the program from the server computer to a client computer;

determining, at the server computer, a plurality of execution paths that the program took during the period of time, wherein the first execution path is one of the plurality of execution paths;

counting, at the server computer, the number of times that the first execution path was executed at the server computer during the period of time;

adding, at the server computer, encountered instructions to the first execution path, wherein the encountered instructions were encountered by execution of the program at the client computer more than an encountered threshold number of times;

allowing, at the server computer, the instructions that are on the first execution path to remain in the program; and allowing, at the server computer, the breakpoints that are not contiguous to each other to remain in the program.

16. A server computer comprising:

a processor; and memory communicatively coupled to the processor, wherein the memory is encoded within instructions, and wherein the instructions when executed on the processor comprise determining a first execution path in a program that has been executed a largest number of times, as compared to at least one other path in the program, replacing swapped instructions, in the program, that are not on the first execution path with breakpoints, replacing a plurality of contiguous breakpoints of the breakpoints, in the program, the plurality of contiguous breakpoints not being on the first execution path, with a single control word, wherein the single control word occupies a single instruction in the program and specifies a number of the contiguous breakpoints that the single control word represents, creating a breakpoint table that comprises the swapped instructions that were replaced in the program with the breakpoints and that comprises probabilities of execution of the swapped instructions, and sending the program from the server computer to a client computer, wherein the client computer replaces the control word, in the program, with the contiguous breakpoints that the control word represents, in the number specified by the control word, prior to execution of the program at the client computer, and executes said program by accessing one or more entries in the breakpoint table, each entry corresponding to a respective location of a breakpoint of the contiguous breakpoints, to obtain a respective swapped instruction corresponding to the respective location of the breakpoint of the contiguous breakpoints.

17. The server computer of claim 16, wherein the instructions further comprise:

sending the breakpoint table from the server computer to the client computer after the sending the program to the client computer.

18. The server computer of claim 16, wherein the instructions further comprise:

sending the breakpoint table from the server computer to the client computer after execution of the program at the client computer encounters one of the breakpoints.

19. The server computer of claim 16, wherein, in response to execution of the program at the client computer encountering one of the breakpoints, the client computer stores, into the program, the swapped instructions from the breakpoint table that have the probabilities of execution that exceed a probability threshold.

20. The server computer of claim 16, wherein the determining the first execution path in the program further comprises:

executing the program at the server computer for a period of time that is less than an estimated download time of the program from the server computer to the client computer;

determining a plurality of execution paths that the program took during the period of time, wherein the first execution path is one of the plurality of execution paths;

counting the number of times that the first execution path was executed at the server computer during the period of time;

adding encountered instructions to the first execution path, wherein the encountered instructions were encountered by execution of the program at the client computer more than an encountered threshold number of times;

allowing the instructions that are on the first execution path to remain in the program; and allowing the breakpoints that are not contiguous to each other to remain in the program.

\* \* \* \* \*